(12) United States Patent
Cha

(10) Patent No.: US 7,303,684 B2
(45) Date of Patent: Dec. 4, 2007

(54) PROCESS FOR MICROWAVE ALTERNATIVE DESTRUCTION-ADSORPTION

(76) Inventor: Chang Yul Cha, 3807 Reynolds St., Laramie, WY (US) 82072

( * ) Notice: Subject to any disclaimer, the term of this patent is extended or adjusted under 35 U.S.C. 154(b) by 731 days.

(21) Appl. No.: 10/754,294

(22) Filed: Jan. 9, 2004

(65) Prior Publication Data

US 2005/0154248 A1 Jul. 14, 2005

(51) Int. Cl.
*B01D 15/00* (2006.01)
*C02F 1/30* (2006.01)
*C02F 1/28* (2006.01)
*A62D 3/178* (2006.01)

(52) U.S. Cl. ............... 210/694; 210/690; 210/691; 210/748; 588/310

(58) Field of Classification Search ............... 210/694, 210/748, 691, 661, 690, 784; 588/310, 301, 588/313; 204/158.2, 157.6
See application file for complete search history.

(56) References Cited

U.S. PATENT DOCUMENTS 6,187,988 B1 * 2/2001 Cha ........................... 210/748

* cited by examiner

*Primary Examiner*—Wayne A. Langel
*Assistant Examiner*—James Fiorito
(74) *Attorney, Agent, or Firm*—John O. Mingle

(57) ABSTRACT

An economically viable process for the microwave destruction of contaminated water-based liquids, such as by chemical and biological agents, employs carbonaceous materials to enhance the efficiency of the microwaves while keeping the bulk temperature down to only a modest rise. A second absorption reactor is used not employing microwaves. The cyclic microwave use of both reactors allows high efficiency for the total process of destruction—adsorption.

19 Claims, 1 Drawing Sheet

PROCESS FOR MICROWAVE ALTERNATIVE DESTRUCTION-ADSORPTION

The subject invention was performed under U.S. Army Contract DAAD 19-03-C-0026, and the United States Government has certain rights in this invention.

BACKGROUND OF THE INVENTION

1. Field of Invention

The present invention relates to a process using radiofrequency microwave energy for the destruction of contaminated water-based liquids via a two stage alternating destruction and adsorption cycles.

2. Background

In today's modern world much contaminated material is generated. Such contaminated waste often is present as a water-based liquid after a washing process, and may contain, among other contaminants, chemical and biological agents that are harmful to humans. Thus disposal is a safety problem, and further such largely water residual is often required for recycled use, such as for cyclic washing of contaminated vehicles.

In the modern war on terrorism contamination of vehicles with chemical and biological agents is a real possibility and the subject process represents a viable way for cleaning such vehicles while destroying such agents and safely recycling the wash water.

The subject process employs microwaves to destroy such contaminants that occur in the form of organic chemicals and biological materials. To further enhance the effect of microwaves at low temperatures, carbonaceous material is employed that selectively absorbs microwaves in the presence of water, and selectively adsorbs the contaminants from the water when microwaves are absent. Additionally this process keeps the bulk temperature down to a modest level below about 200° F.

It is noted that chemical agents and biological agents are a special class of chemicals and are not identical to a hazardous material classification. Chemical agents are commonly related to "poisonous gaseous" and other such chemical compounds and are often employed in warfare or terrorist activities. In World War I mustard gas, $C_4H_8Cl_2S$, was so employed as was cyanide gases Biological agents although composed of organic molecules in a microorganism form have a special designation of being able to severely and usually fatally attack living organisms. Anthrax spores are such a biological agent and are employed in terrorist activities. Such biological agents are potentially carried by gas or liquid streams or may be washed from materials, such as cloth, metals, or other solids.

Yet the subject invention being a two-stage destruction—adsorption process alternatively employing microwaves can effectively process not only chemical and biological agents but also many hazardous materials.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems,* Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwave" or "microwaves" is generally employed to represent "radiofrequency energies selected from the range of about 500 to 5000 MHz," since in a practical sense this large range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions at a high temperature, often more than 3000° F., and at much reduced pressures or vacuum conditions. For instance, refer to Kirk-Othmer, *Encyclopedia of Chemical Technology,* 3rd Edition, Supplementary Volume, pages 599-608, Plasma Technology. In microwave technology, as applied in the subject invention, neither of these conditions is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates; thus, in this writing the term "microwave catalysis" refers to "the absorption of microwave energy by carbonaceous materials when a simultaneous chemical reaction is occurring" For instance, refer to Kirk-Othmer, *Encyclopedia of Chemical Technology,* 3rd Edition, Volume 15, pages 494-517, Microwave Technology.

Related United States microwave patents include:

| U.S. Pat. No. | Inventor    | Year |
|---------------|-------------|------|
| 6,045,663     | Cha         | 2000 |
| 6,046,376     | Cha et al.  | 2000 |
| 6,187,988     | Cha         | 2001 |

Referring to the above list, Cha '663 discloses the enhancement of wet oxidation by microwaves utilizing carbonaceous material. Wet oxidation involves a water medium saturated with oxygen and containing organic contaminants, such as hazardous solvents, but not containing biological material. The process employs only a single microwave irradiated reactor containing carbonaceous material. The process shows that such carbonaceous material, often activated carbon, preferentially absorbs microwaves in the presence of water.

Cha et al. disclose the enhancement of gaseous decomposition from a solution by microwaves utilizing carbonaceous material. An important example is the wet calcination of bicarbonate solutions, such as trona. The decomposition reaction is restricted to inorganic chemicals. The process employs only a single microwave irradiated reactor containing carbonaceous material. The process shows that such carbonaceous material, often activated carbon, preferentially absorbs microwaves in the presence of water.

Cha '988 discloses the decomposition of hazardous materials by the use of microwaves enhanced by carbonaceous material, often activated carbon. The hazardous material is restricted to those organic compounds that are legally classified in this manner and not to material that could be classified as only harmful. A selected microorganism, pseudomonas bacteria, which is not a biological agent, was also decomposed. The process employs only a single microwave irradiated reactor containing carbonaceous material. The process shows that the required decomposition occurs either with a water or gaseous medium.

SUMMARY OF INVENTION

The objectives of the present invention include overcoming the above-mentioned deficiencies in the prior art of employing only a single reactor. An economically viable process for the microwave destruction of contaminated water-based liquids, such as by chemical and biological agents, employs carbonaceous materials to enhance the efficiency of the microwaves while keeping the bulk temperature down to only a modest rise. A second absorption reactor is employed not employing microwaves. The cyclic microwave use of both reactors allows high efficiency for the total process. Application of microwaves is periodically switched to the adsorption reactor to destroy chemical and agents and hazardous materials adsorbed by the carbonaceous materials.

BRIEF DESCRIPTION OF THE DRAWING

The FIGURE shows process equipment utilized for this alternative destruction—adsorption utilizing cyclic microwave usage.

DETAILED DESCRIPTION OF INVENTION

Figure 1:
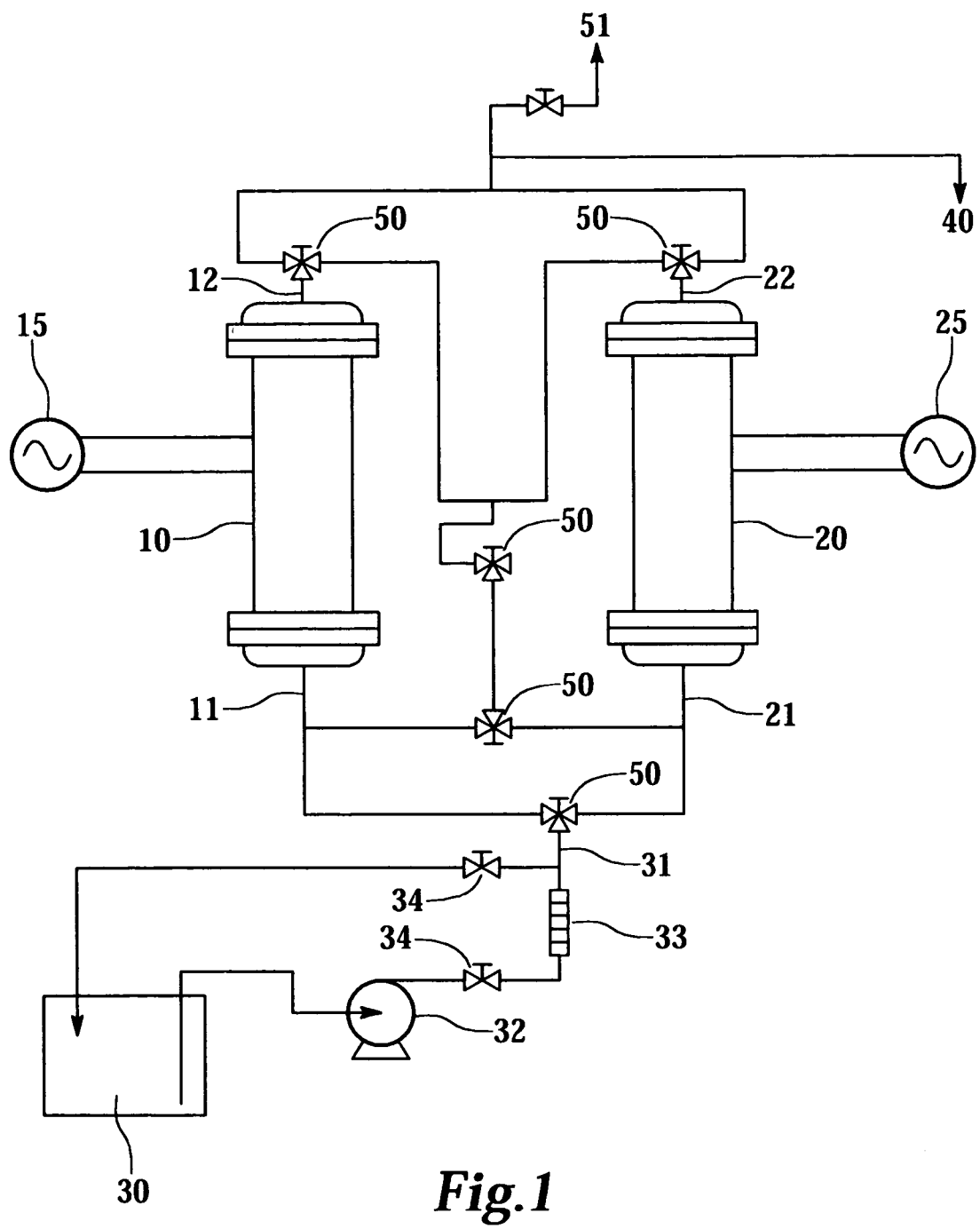

Microwaves are a versatile form of energy that is applicable to enhance chemical reactions since the energy is locally applied by its largely vibrational absorption by polar molecules and further does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwaves absorber since it has a wide range of polar impurities that readily interact with such radiofrequency energy especially in electron vibrational modes. Consequently the waveguide design for the microwave cavity is not usually critical. Carbonaceous material for use with the subject invention commonly comprises activated carbon, char, soot, pyrolytic carbon, carbon black, activated charcoal, and metal carbides.

In many instances activated carbon is the preferred material to employ under ambient temperature and pressure conditions, although activated charcoal, if readily available, is likely more cost effective. However in gaseous systems, especially at higher temperatures or the presence of oxygen, other carbonaceous materials such as metal carbides, especially silicon carbide, are convenient to utilize. Silicon carbide is conveniently utilized as a microwave absorbing substrate to enhance conventional catalytic processes.

The microwave excitation of the molecules of the carbonaceous material, often referred to as microwave catalysis, excites constituents, such as impurities and contaminants including chemical and biological agents and hazardous materials that have been adsorbed on, or in some instances attracted to, the surfaces of the carbonaceous material and produces a highly reactive condition. Further molecules from a carrier medium, such as a sweep or purge gas, are in close proximity or within the surface boundary layer of the carbon surface through chemi-sorption, absorption, adsorption, or diffusion, and additional chemical reactions with these constituents are possible.

Additionally, carbonaceous materials, particularly activated carbon, preferentially absorb microwaves in the presence of water. Thus aqueous mediums are employable to transmit the contaminated wastes.

The medium present in the subject invention is likely to be water based since washing down substances contaminated with chemical and biological agents, and sometimes hazardous materials, is a common method of decontamination. Yet other base liquids are possible if the frequency of the microwaves employed is preferentially absorbed by the particular carbonaceous material employed over the base liquid. Yet the efficiency of this type of system is lower than the examples employing water and activated carbon described below.

The FIGURE shows the flow sheet for the general process. The first reactor 10 with a liquid feed 11 and a liquid outflow 12 with microwave generator 15, and a second reactor 20 with a liquid feed 21 and a liquid outflow 22 with microwave generator 25, and both contain a carbonaceous bed that has the ability to be radiated by such microwaves. Further the microwaves are energized for only one of the reactors at a time, and then the microwaves are tuned off from that reactor and turned on for the other reactor in a cyclic manner normally involving measurement in an hourly manner. If the reactor energized by microwaves 15 is the first reactor 10, then microwave catalysis is occurring in this destruction reactor, and consequently the second reactor 20 is not exposed to microwaves 25 and that carbonaceous bed is only adsorbing contaminants from the liquid flow through this adsorption reactor. Once the microwaves are reversed and the second reactor 20 is radiated, then this reactor now undergoes microwave catalysis not only with respect to the contaminants in the liquid flow, but also with the contaminants previously adsorbed by the carbonaceous bed. In essence the carbonaceous bed in the second reactor 20 is regenerated over time. Further now the first reactor 10 serves as the adsorbing medium with its carbonaceous bed. Additionally the flow from the feed supply 31, that comes from the feed reservoir 30, flows through pump 32 and flowrater 33 and is controlled by values 34, may or may not be interchanged from the first reactor 10 to the second reactor 20, and consequently the final output 40 of the process containing decontaminated liquid may or may not be also reversed for collection. The liquid interchange mechanism contains numerous controlled piping and valves 50 so that such a liquid interchange occurs nearly simultaneously with that for the microwave interchange that may be automatic or hand controlled, as both are controlled by the same timing mechanism. As part of the conventional liquid flow mechanism, a vent 51 is provided for release of gaseous products from the microwave catalysis occurring in the process. The microwave system 15 and 25 are adjustable in power to allow flexibility in the amount of liquid flow passing through the reactors and still produce a good overall efficiency in total decontamination.

The following example employs apparatus that is common for the use of radiating a subject matter by microwaves in the presence of carbonaceous materials. Said apparatus has been shown and explained in previous patents by the inventor: U.S. Pat. Nos. 6,045,663; 6,046,376; 6,187,988; and 6,207,023 are typical; and these specifications and drawings are hereby incorporated by reference.

EXAMPLE

The trail utilized quartz tube reactors (R1 and R2) surrounded by helical microwave coils. The two carbonaceous beds were GX191ER activated carbon or equivalent of about 500 grams each. The microwave generator was a Cober SF6 or equivalent capable of 1000 watts of magnetron power. The temperature of each reactor outlet was measured to insure that steady state conditions existed before sampling. Sampling occurred for Total Organic Carbon (TOC) and was determined by conventional instrumentation. A typical feed solution was designed to represent a contaminated wash solution and consisted of 20-L tap water, 4-ml gasoline, 4-ml JP-8 fuel, 2-ml engine oil, and 20-ml car-wash soap. Additionally a small quantity of diethyl sulfide or dimethyl methylphosphinate was employed to simulate a typical chemical agent or hazardous material; however, the amount did not significantly change the TOC measured. Further biological agents are known to be destroyed by such microwaves. Table 1 gives the results of a series of runs for various time switch intervals employing double switching.

TABLE 1

REMOVAL EFFICIENCIES

| Switch Time (min) | Feed TOC (ppm) | TOC Removal % |
|---|---|---|
| 30 | 144 | 96.0 |
| 60 | 133 | 98.7 |
| 60 | 154 | 99.1 |
| 90 | 105 | 99.2 |
| 120 | 109 | 99.0 |

The High efficiencies indicate the potential productiveness of this destruction—absorption process for producing decontaminated liquids.

A process for microwave destruction of a contaminated liquid comprising passing the input liquid through a first reactor, wherein the first reactor contains a carbonaceous bed that is undergoing microwave irradiation. Then passing the output from the first reactor through a second reactor, wherein the second reactor contains a carbonaceous bed. Interchanging after a given time interval irradiation by microwaves between the first and second reactors, and further simultaneously interchanging the input liquid from the first and second reactors. Finally collecting substantially decontaminated liquid initially from the output of the second reactor, and then after the interchanging, from the output of the first reactor.

The liquid is contaminated by toxic substances selected from the group consisting of chemical agents, biological agents, and hazardous materials. All carbonaceous beds are selected from the group consisting of activated carbon, char, soot, pyrolytic carbon, activated charcoal, metal carbides, and combinations thereof, however, the best mode utilizes activated carbon. The given time interval further comprises a cyclic time period and in the best mode is measured in hourly increments. The microwaves are within the frequency range of 500 to 5000 MHz for best mode conditions, although frequencies outside this range are acceptable. The liquid is often water based although such water often contains materials that are not considered contaminants. The decontaminated liquid is often vented for retained gases, and if such gases represent a large volume, they are further processed before release. Additionally if such gases represent a small amount, then a sweeping gas is potentially employable.

A process for microwave destruction of a contaminated liquid comprising passing the liquid through a first reactor, wherein the first reactor contains a carbonaceous bed being irradiation by microwaves. Then passing the output from the first reactor through a second reactor, wherein the second reactor contains a carbonaceous bed. Shifting on a given time interval the irradiation by microwaves between the first reactor and the second reactor, and collecting substantially decontaminated liquid from the output of said second reactor. In this process, that is similar to the previous one, the difference is that no change in the flow of the liquid is provided; the liquid enters the first reactor and then always flows to the second reactor. Thus, only the microwave irradiation is cycled.

A process for microwave destruction of water contaminated by organic material comprising passing said input water through a first reactor, wherein the first reactor contains an activated carbon bed that is undergoing microwave irradiation. Then passing the output from the first reactor through a second reactor, wherein the second reactor contains an activated carbon bed. Interchanging after a given time interval irradiation by microwaves between the first and second reactors, and further simultaneously interchanging the input water from the first and second reactors. Finally collecting substantially decontaminated water initially from the output of the second reactor, and then after the interchanging, from the output of the first reactor. The time interval is a cyclic time period and in the best mode is measured in hourly increments. The microwaves are within the frequency range of 500 to 5000 MHz for best mode conditions, although frequencies outside this range are acceptable. This process is quite similar to the initial process explained above except that only activated carbon is employed and the liquid is restricted to being water based, although such water often contains materials that are not considered contaminants. Again the final processed water is potentially vented for retained gases.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. A process for microwave destruction of a contaminated liquid comprising:
   passing said input liquid through a first reactor, wherein said first reactor contains a carbonaceous bed that is undergoing microwave irradiation;
   passing said output from said first reactor through a second reactor, wherein said second reactor contains a carbonaceous bed;
   interchanging after a given time interval irradiation by microwaves between said first and second reactors, and further simultaneously interchanging the input liquid from said first and second reactors; and
   collecting substantially decontaminated liquid initially from the output of said second reactor, and then after said interchanging from the output of said first reactor.

2. The process according to claim 1 wherein said liquid further comprises being contaminated by toxic substances selected from the group consisting of chemical agents, biological agents, and hazardous materials.

3. The process according to claim 1 wherein all carbonaceous beds further comprises being selected from the group consisting of activated carbon, char, soot, pyrolytic carbon, activated charcoal, metal carbides, and combinations thereof.

4. The process according to claim 1 wherein said given time interval further comprises a cyclic time period.

5. The process according to claim 1 wherein said microwaves are within the frequency range of 500 to 5000 MHz.

6. The process according to claim 1 wherein said liquid further comprises water.

7. The process according to claim 1 wherein said decontaminated liquid further comprises being vented for retained gases.

8. A process for microwave destruction of a contaminated liquid comprising:
   passing said liquid through a first reactor, wherein said first reactor contains a carbonaceous bed being irradiation by microwaves;
   passing said output from said first reactor through a second reactor, wherein said second reactor contains a carbonaceous bed;
   shifting on a given time interval said irradiation by microwaves between said first reactor and said second reactor, and
   collecting substantially decontaminated liquid from the output of said second reactor.

9. The process according to claim 8 wherein said liquid further comprises being contaminated by chemical agents.

10. The process according to claim 8 wherein said liquid further comprises being contaminated by biological agents.

11. The process according to claim 8 wherein all carbonaceous beds further comprises being selected from the group consisting of activated carbon, char, soot, pyrolytic carbon, activated charcoal, metal carbides, and combinations thereof.

12. The process according to claim 8 wherein said given time interval further comprises a cyclic time period.

13. The process according to claim 8 wherein said microwaves are within the frequency range of 500 to 5000 MHz.

14. The process according to claim 8 wherein said liquid further comprises water.

15. The process according to claim 8 wherein said decontaminated liquid further comprises being vented for retained gases.

16. A process for microwave destruction of water contaminated by organic material comprising:
   passing said input water through a first reactor, wherein said first reactor contains an activated carbon bed that is undergoing microwave irradiation,
   passing said output from said fist reactor through a second reactor, wherein said second reactor contains an activated carbon bed;
   interchanging after a given time interval irradiation by microwaves between said first and second reactors, and further simultaneously interchanging the input water from said first and second reactors; and
   collecting substantially decontaminated water initially from the output of said second reactor, and then after said interchanging from the output of said first reactor.

17. The process according to claim 16 wherein said given time interval further comprises a cyclic time period.

18. The process according to claim 16 wherein said microwaves are within the frequency range of 500 to 5000 MHz.

19. The process according to claim 16 wherein said decontaminated water further comprises being vented for retained gases.

* * * * *